(12) United States Patent
Huang et al.

(10) Patent No.: US 8,729,820 B2
(45) Date of Patent: May 20, 2014

(54) LOW PIN COUNT LED DRIVER INTEGRATED CIRCUIT

(75) Inventors: Tsung-Wei Huang, Jubei (TW); Shui-Mu Lin, Longjing Township, Taichung County (TW); Pao-Hsun Yu, Hsinchu (TW); Ying-Hsin Hsing, Taipei (TW)

(73) Assignee: Richtek Technology Corp., Hsinchu (TW)

( * ) Notice: Subject to any disclaimer, the term of this patent is extended or adjusted under 35 U.S.C. 154(b) by 484 days.

(21) Appl. No.: 12/831,528

(22) Filed: Jul. 7, 2010

(65) Prior Publication Data
US 2011/0006697 A1    Jan. 13, 2011

(30) Foreign Application Priority Data
Jul. 10, 2009 (TW) .............................. 98123450 A (51) Int. Cl.
*H05B 41/36* (2006.01)
*G05F 1/10* (2006.01)

(52) U.S. Cl.
USPC ........................... 315/291; 315/224; 327/536

(58) Field of Classification Search
USPC ............ 315/224–226, 291, 209 R, 307, 308, 315/312; 327/536–540
See application file for complete search history.

(56) References Cited

U.S. PATENT DOCUMENTS

| | | | |
|---|---|---|---|
| 6,618,296 B2 * | 9/2003 | Zhang | 365/189.09 |
| 6,873,203 B1 * | 3/2005 | Latham et al. | 327/538 |
| 6,897,709 B2 * | 5/2005 | Henry | 327/536 |
| 7,368,977 B2 * | 5/2008 | Wei et al. | 327/536 |
| 2006/0066389 A1 * | 3/2006 | Wardle | 327/536 |

* cited by examiner

*Primary Examiner* — Jimmy Vu
*Assistant Examiner* — Amy Yang
(74) *Attorney, Agent, or Firm* — Muncy, Geissler, Olds & Lowe, P.C.

(57) ABSTRACT

A LED driver integrated circuit has a voltage input pin, a voltage output pin, a capacitor pin, and a switching circuit connected to the capacitor pin and the voltage output pin. The capacitor pin and the voltage output pin are for a flying capacitor to be connected therebetween, and thus the switching circuit and the flying capacitor establish a charge pump to convert an input voltage received by the voltage input pin into an output voltage at the voltage output pin.

9 Claims, 8 Drawing Sheets

LOW PIN COUNT LED DRIVER INTEGRATED CIRCUIT

FIELD OF THE INVENTION

The present invention is related generally to a light emitting diode (LED) driver and, more particularly, to a low pin count (LPC) LED driver integrated circuit (IC).

BACKGROUND OF THE INVENTION

Figure 1:
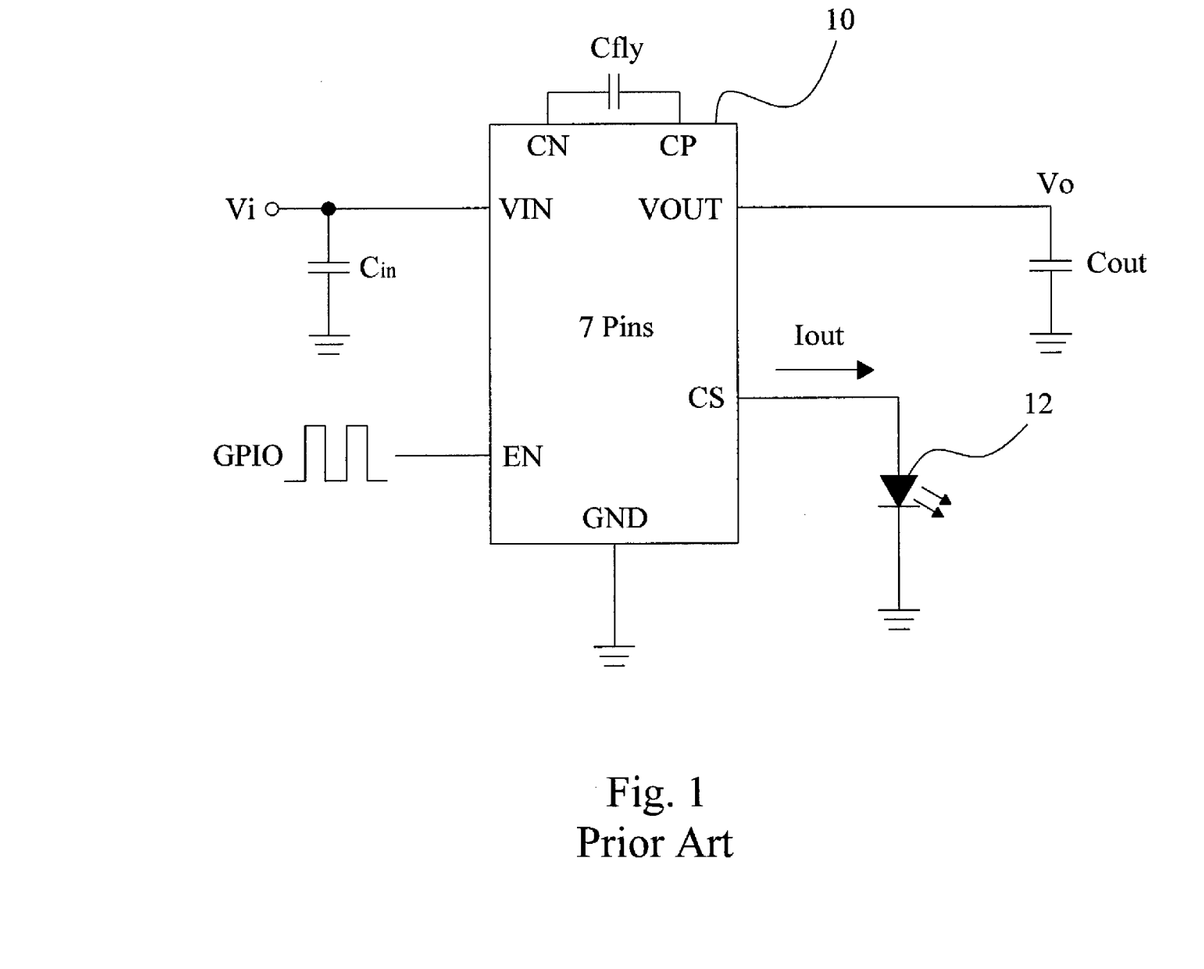
FIG. 1 is a configuration of a conventional LED driver IC.

As shown in FIG. 1, a conventional LED driver IC 10 requires at least seven pins, including two capacitor pins CN and CP for a flying capacitor Cfly to be connected therebetween, a voltage input pin VIN to receive an input voltage Vi, a voltage output pin VOUT to connect to an output capacitor Cout to provide an output voltage Vo for driving an LED 12, a current output pin CS to connect to the LED 12 to provide a drive current Iout thereto, a dimming control pin EN to receive a dimming control signal GPIO to adjust the average value of the drive current Iout to thereby adjust the luminance of the LED 12, and a ground pin GND to connect to a ground terminal of the system. In order to reduce the pin count for cost reduction, U.S. Pat. No. 7,368,977 uses the capacitor pin CN to receive the dimming control signal GPIO and thus eliminates the dimming control pin EN. However, this art now can not satisfy the demands of users on LPC ICs.

Therefore, it is desired an LED driver IC with further reduced pin count.

SUMMARY OF THE INVENTION

An object of the present invention is to provide a LPC and low cost LED driver IC.

According to the present invention, an LED driver IC has a voltage input pin, a voltage output pin, a capacitor pin, and a switching circuit. The voltage input pin is for receiving an input voltage, the voltage output pin is for connecting to an LED and a flying capacitor and supplying an output voltage, the capacitor pin is for connecting to the flying capacitor, and the switching circuit is connected to the capacitor pin and the voltage output pin and, together with the flying capacitor, establishes a charge pump to convert the input voltage into the output voltage. As the voltage output pin is also used to be connected with the flying capacitor, the pin count can be reduced. A dimming control signal for controlling the luminance of the LED can be received by the capacitor pin, thereby further reducing the pin count.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 2:
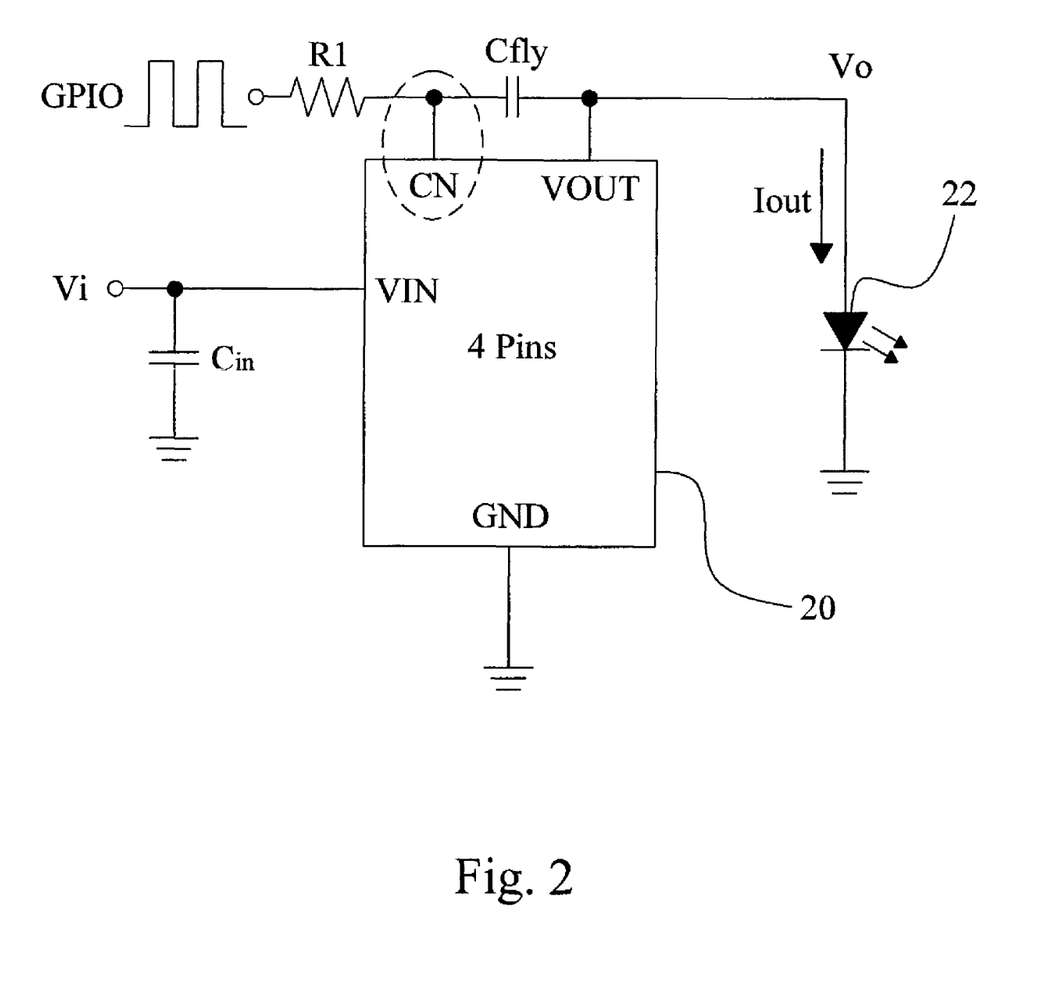
FIG. 2 is a configuration of an LED driver IC according to the present invention.

According to the present invention, as shown in FIG. 2, an LED driver IC 20 can drive an LED 22 and adjust the luminance of the LED 22 by simply using four pins, including a voltage input pin VIN, a voltage output pin VOUT, a capacitor pin CN, and a ground pin GND. The voltage input pin VIN is for receiving an input voltage Vi, the voltage output pin VOUT is for connecting to the LED 22 and a flying capacitor Cfly, the capacitor pin CN is for connecting to the flying capacitor Cfly, and the ground pin GND is for connecting to a ground terminal of the system.

Figure 3:
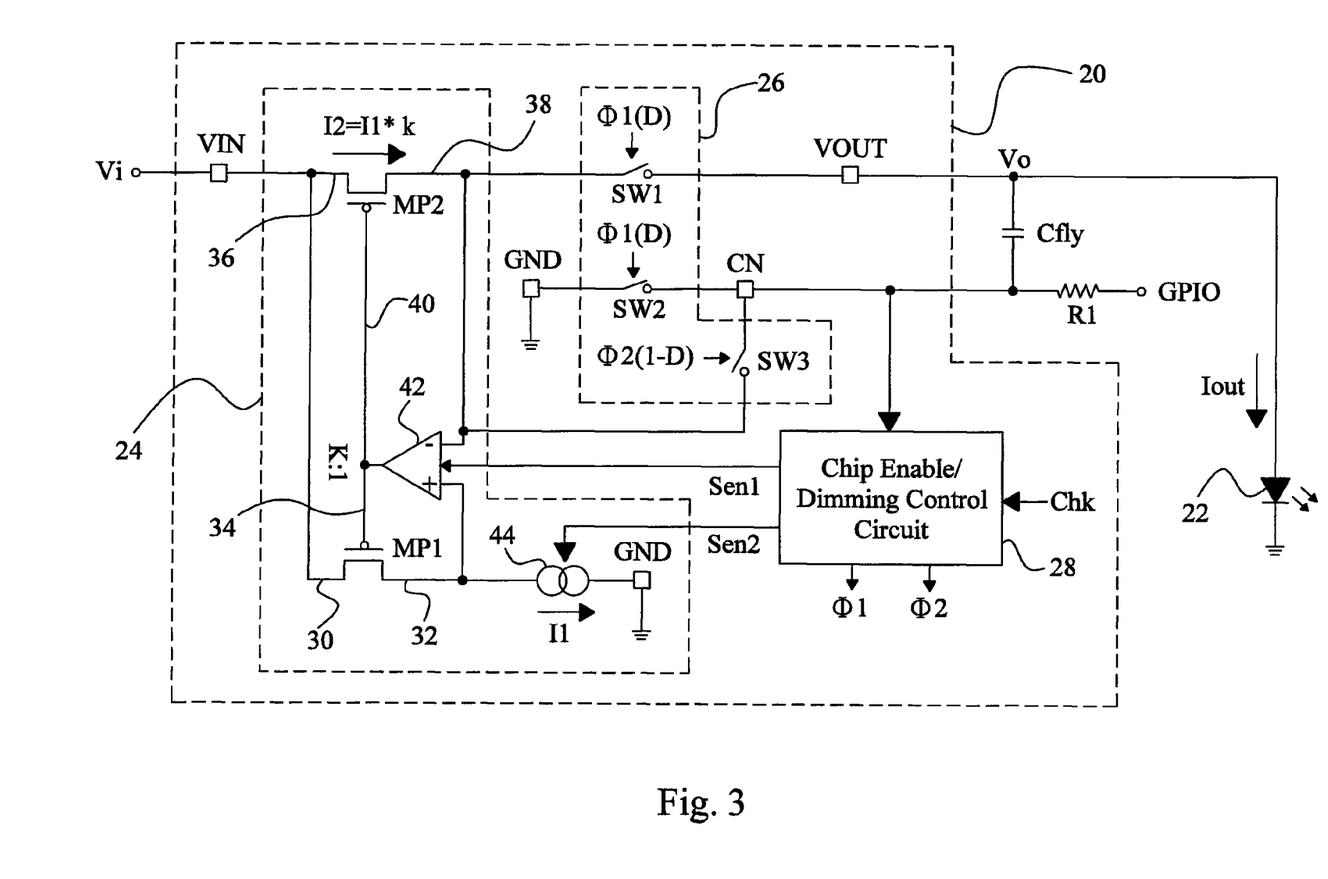
FIG. 3 is a circuit diagram of a first embodiment for the LED driver IC shown in FIG. 2.

FIG. 3 is a circuit diagram of a first embodiment for the LED driver IC 20 shown in FIG. 2. In addition to the four pins VIN, CN, VOUT and GND, this LED driver IC 20 includes a switching circuit 26 connected to the capacitor pin CN and the voltage output pin VOUT and, together with the flying capacitor Cfly, to establish a charge pump to convert the input voltage Vi into an output voltage Vo. The LED driver IC 20 further includes a current supply circuit 24 connected to the switching circuit 26 to provide a current I2 for operation of the charge pump. In the current supply circuit 24, a current source 44 provides a source current I1, a PMOS transistor MP1 has an input terminal 30 connected to the voltage input pin VIN, an output terminal 32 connected to the current source 44, and a control terminal 34, a PMOS transistor MP2 has an input terminal 36 connected to the voltage input pin VIN, an output terminal 38 connected to the switching circuit 26, and a control terminal 40, and an operational amplifier 42 has a non-inverting input terminal connected to the output terminal 32 of the PMOS transistor MP1, an inverting input terminal connected to the output terminal 38 of the PMOS transistor MP2, and an output terminal connected to the control terminals 34 and 40 of the PMOS transistors MP1 and MP2. As the voltages at the output terminals 32 and 38 of the PMOS transistors MP1 and MP2 are locked by the operational amplifier 42 to a same level and the PMOS transistors MP1 and MP2 have a size ratio of 1:K, the PMOS transistor MP2 will mirror the source current I1 from the PMOS transistor MP1 to generate the current I2=I1×K. The switching circuit 26 includes switches SW1, SW2 and SW3. The switch SW1 is controlled by a switching signal Φ1, and has a terminal coupled to the voltage input pin VIN via the PMOS transistor MP2 and the other terminal connected to the voltage output pin VOUT. The switch SW2 is connected between the capacitor pin CN and the ground pin GND, and is also controlled by the switching signal Φ1. The switch SW3 is controlled by a switching signal Φ2, and has a terminal connected to the capacitor pin CN and the other terminal coupled to the voltage input pin VIN via the PMOS transistor MP2. By using the switching signals Φ1 and Φ2 to switch the switches SW1, SW2, and SW3, the charge pump will convert the input voltage Vi received by the voltage input pin VIN into the output voltage Vo at the voltage output pin VOUT. The switching signals Φ1 and Φ2 can be provided by a chip enable/dimming control circuit 28 as shown in FIG. 3, or by other circuits in other embodiments. In this embodiment, the chip enable/dimming control circuit 28 is connected to the capacitor pin CN to detect a dimming control signal GPIO. When the dimming control signal GPIO is detected at high, the chip enable/dimming control circuit 28 provides enable signals Sen1 and Sen2 for the current supply circuit 24 to enable the operational amplifier 42 and the current source 44. A check signal Chk is periodically injected to the chip enable/dimming control circuit 28 to signal the chip enable/dimming control circuit 28 to detect the voltage level at the capacitor pin CN. During a detection interval, the switches SW1, SW2, and SW3 are all turned off for the capacitor pin CN to be floating, and thus the voltage level at the capacitor pin CN can be determined only by the dimming control signal GPIO. The chip enable/dimming control circuit 28 extracts the voltage level of the dimming control signal GPIO by detecting the voltage level at the capacitor pin CN.

Figure 4:
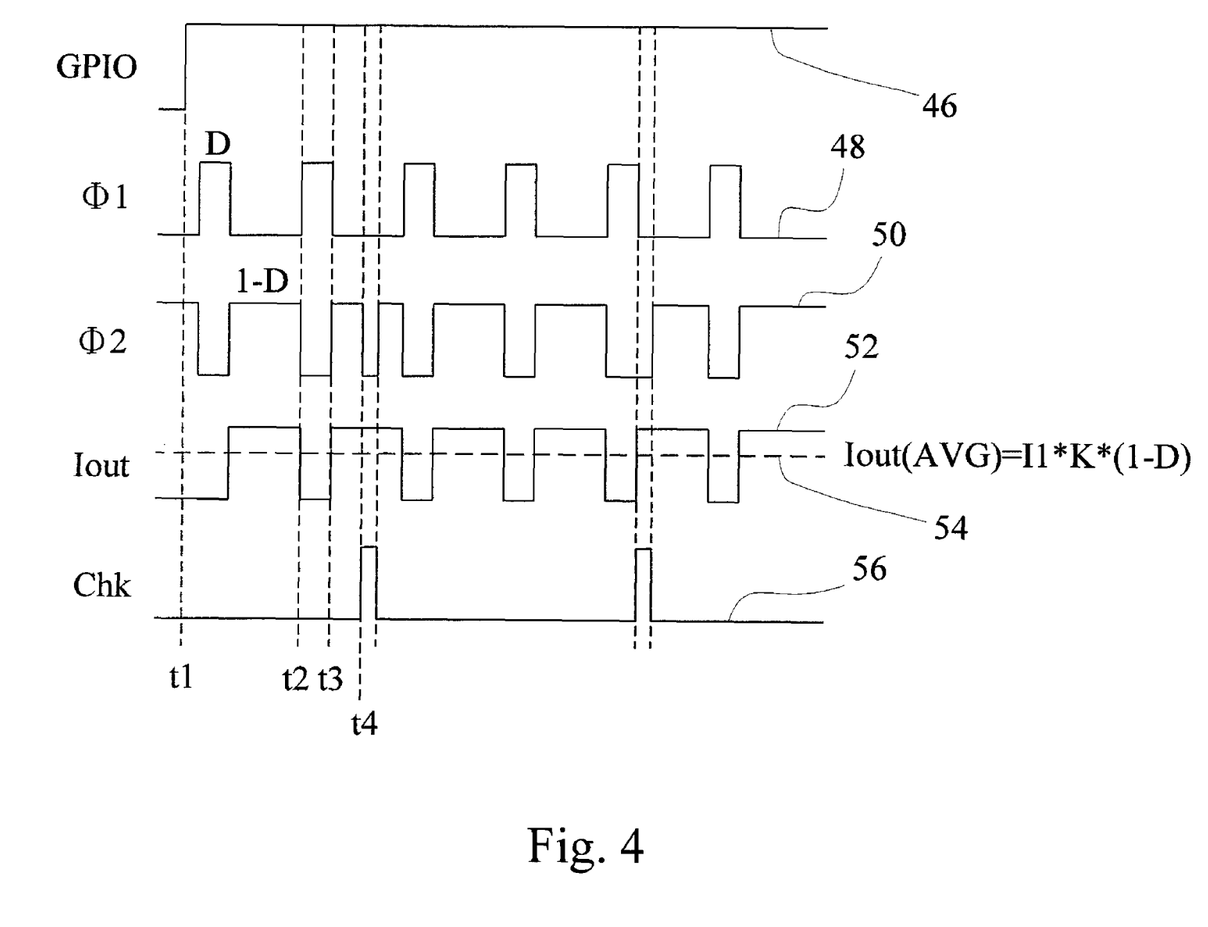
FIG. 4 is a waveform diagram of the circuit shown in FIG. 3.

FIG. 4 is a waveform diagram of the circuit shown in FIG. 3, in which waveform 46 represents the dimming control signal GPIO, waveform 48 represents the switching signal Φ1, waveform 50 represents the switching signal Φ2, waveform 52 represents the drive current Iout of the LED 22, waveform 54 represents the average value Iout(AVG) of the drive current Iout, and waveform 56 represents the check signal Chk. Referring to FIGS. 3 and 4, at time t1, the chip enable/dimming control circuit 28 detects that the dimming control signal GPIO transits to high, so it triggers the enable signals Sen1 and Sen2 to enable the operational amplifier 42 and the current source 44. When the switching signal Φ1 is high and the switching signal Φ2 is low, as shown at time t2, the switches SW1 and SW2 are on and the switch SW3 is off, so that the current I2 flows to the ground pin GND via the switch SW1, the voltage output pin VOUT, the flying capacitor Cfly, the capacitor pin CN, and the switch SW2, and thus charges the flying capacitor Cfly. Therefore, the drive current Iout is zero. When the switching signal Φ1 is low and the switching signal 12 is high, as shown at time t3, the switches SW1 and SW2 are off and the switch SW3 is on, so that the current I2 flows to the LED 22 via the switch SW3, the capacitor pin CN, and the flying capacitor Cfly, and thus Iout=I2. The drive current Iout has the average value $$Iout(AVG)=I2\times(1-D),\qquad [Eq\text{-}1]$$

where D is duty of the switching signal Φ1, and (1−D) is duty of the switching signal Φ2. Since I2=I1×K, the equation Eq-1 can be rewritten into $$Iout(AVG)=I1\times K\times(1-D).\qquad [Eq\text{-}2]$$

When the chip enable/dimming control circuit 28 receives the check signal Chk, as shown at time t4, both the switching signals Φ1 and Φ2 transit to low such that the capacitor pin CN becomes floating, and the chip enable/dimming control circuit 28 can detect the voltage level of the dimming control signal GPIO through the capacitor pin CN.

In the LED driver IC 20, in addition to provide the output voltage Vo, the voltage output pin VOUT also serves as a pin for connection to the flying capacitor Cfly, and in addition to connect to the flying capacitor Cfly, the capacitor pin CN also serves as a pin to receive the dimming control signal GPIO. In the LED driver IC 20, compared with the conventional LED driver IC 10 shown in FIG. 1, the dimming control pin EN, the capacitor pin CP, and the current output pin CS are all eliminated.

Figure 5:
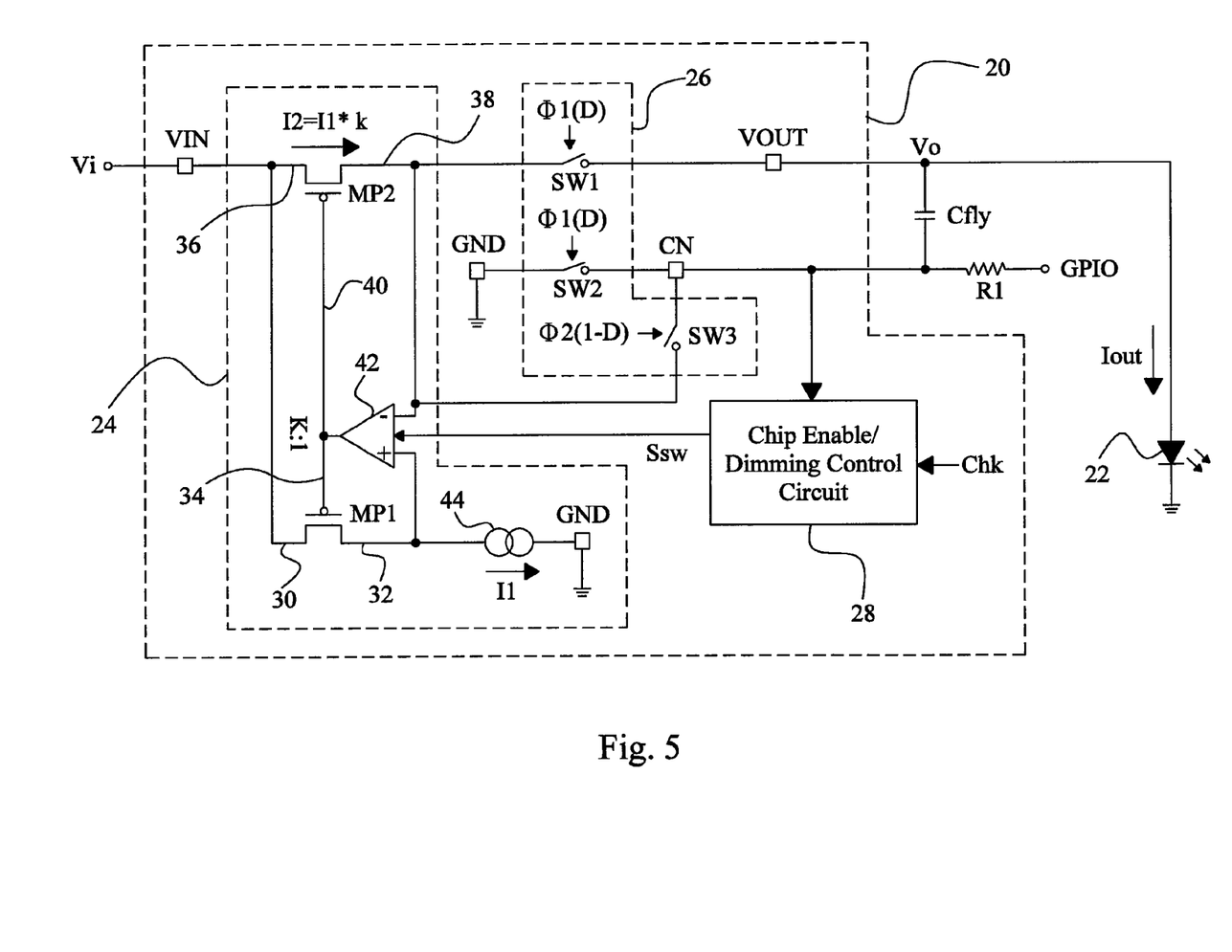
FIG. 5 is a circuit diagram of a second embodiment for the LED driver IC shown in FIG. 2.
Figure 6:
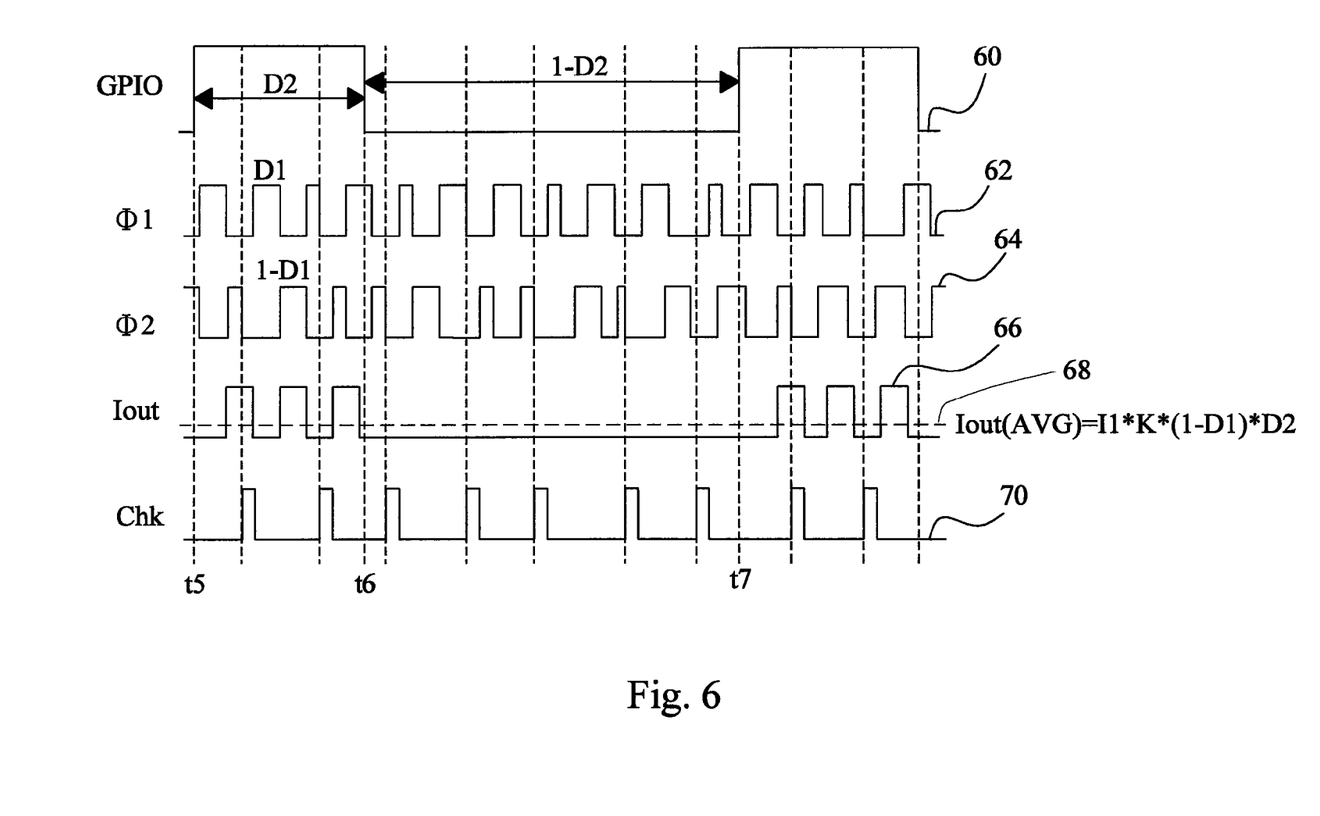
FIG. 6 is a waveform diagram of the circuit shown in FIG. 5.

FIG. 5 is a circuit diagram of a second embodiment for the LED driver IC 20 shown in FIG. 2, which is similar to that of FIG. 3 except that the chip enable/dimming control circuit 28 provides a switching signal Ssw to turn the operational amplifier 42 on and off. FIG. 6 is a waveform diagram of the circuit shown in FIG. 5, in which waveform 60 represents the dimming control signal GPIO, waveform 62 represents the switching signal Φ1, waveform 64 represents the switching signal Φ2, waveform 66 represents the drive current Iout, waveform 68 represents the average value Iout(AVG) of the drive current Tout, and waveform 70 represents the check signal Chk. Since the luminance of the LED 22 depends on the average value Iout(AVG) of the drive current Iout, it can be adjusted by adjusting the average value Iout(AVG). In FIGS. 5 and 6, the average value Iout(AVG) is adjusted by controlling the on and off states of the operational amplifier 42. When the chip enable/dimming control circuit 28 receives the check signal Chk, both the switching signals Φ1 and 12 transit to low such that the capacitor pin CN becomes floating, and thus the chip enable/dimming control circuit 28 can detect the voltage level at the capacitor pin CN to identify the voltage level of the dimming control signal GPIO. If the dimming control signal GPIO is high, as shown between time t5 and time t6, the chip enable/dimming control circuit 28 allows the operational amplifier 42 to operate normally and at this time, the LED driver IC 20 supplies the drive current Iout to the LED 22. When it is detected that the dimming control signal GPIO is low, as shown between time t6 and time t7, the chip enable/dimming control circuit 28 disables the operational amplifier 42 and at this time, the LED driver IC 20 stops supplying the drive current Iout to the LED 22. Suppose that the duty of the switching signal Φ1 is D1 and the duty of the dimming control signal GPIO is D2, then the equation Eq-2 can be rewritten into $$Iout(AVG)=I1\times K\times(1-D1)\times D2.\qquad [Eq\text{-}3]$$

From the equation Eq-3, it is shown that the average value Iout(AVG) of the drive current Iout can be adjusted by adjusting the duty D2 of the dimming control signal GPIO, and so the luminance of the LED 22.

Figure 7:
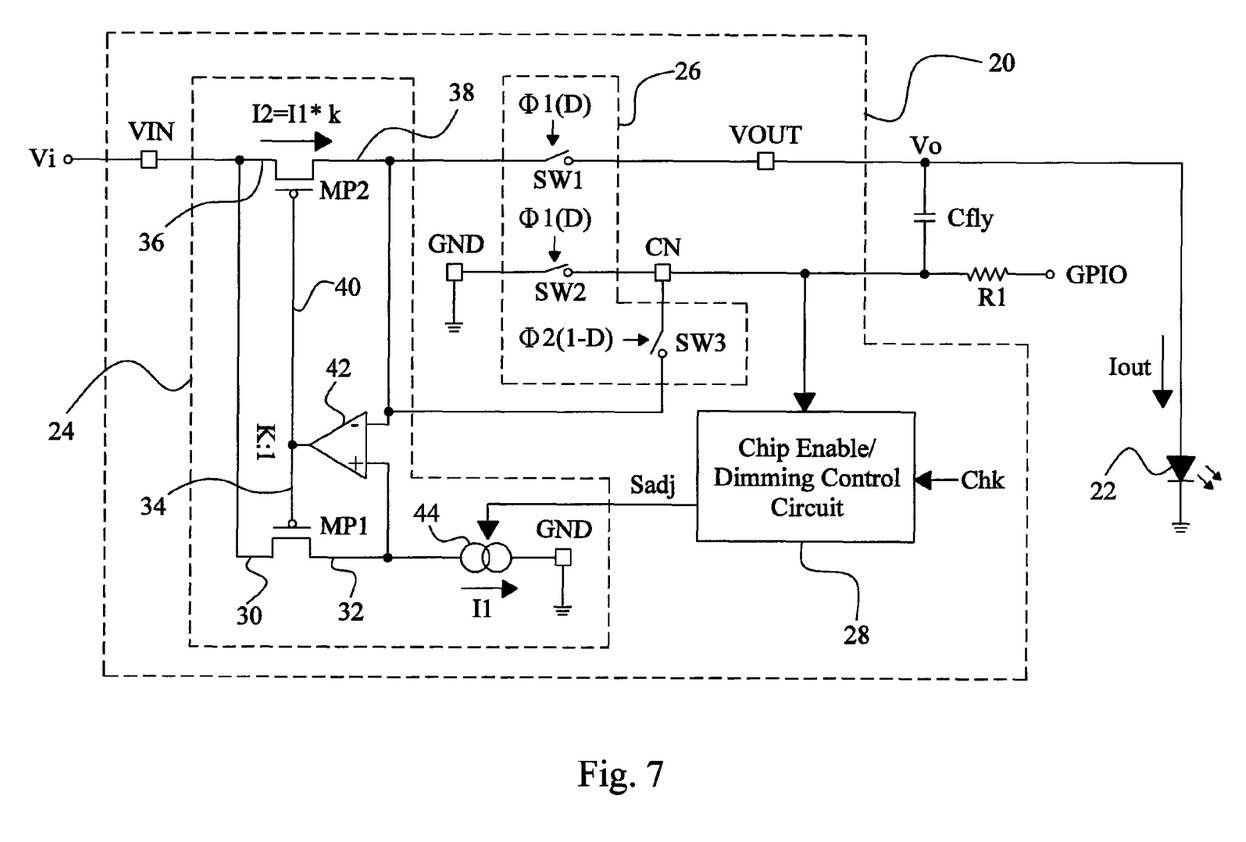
FIG. 7 is a circuit diagram of a third embodiment for the LED driver IC shown in FIG. 2.
Figure 8:
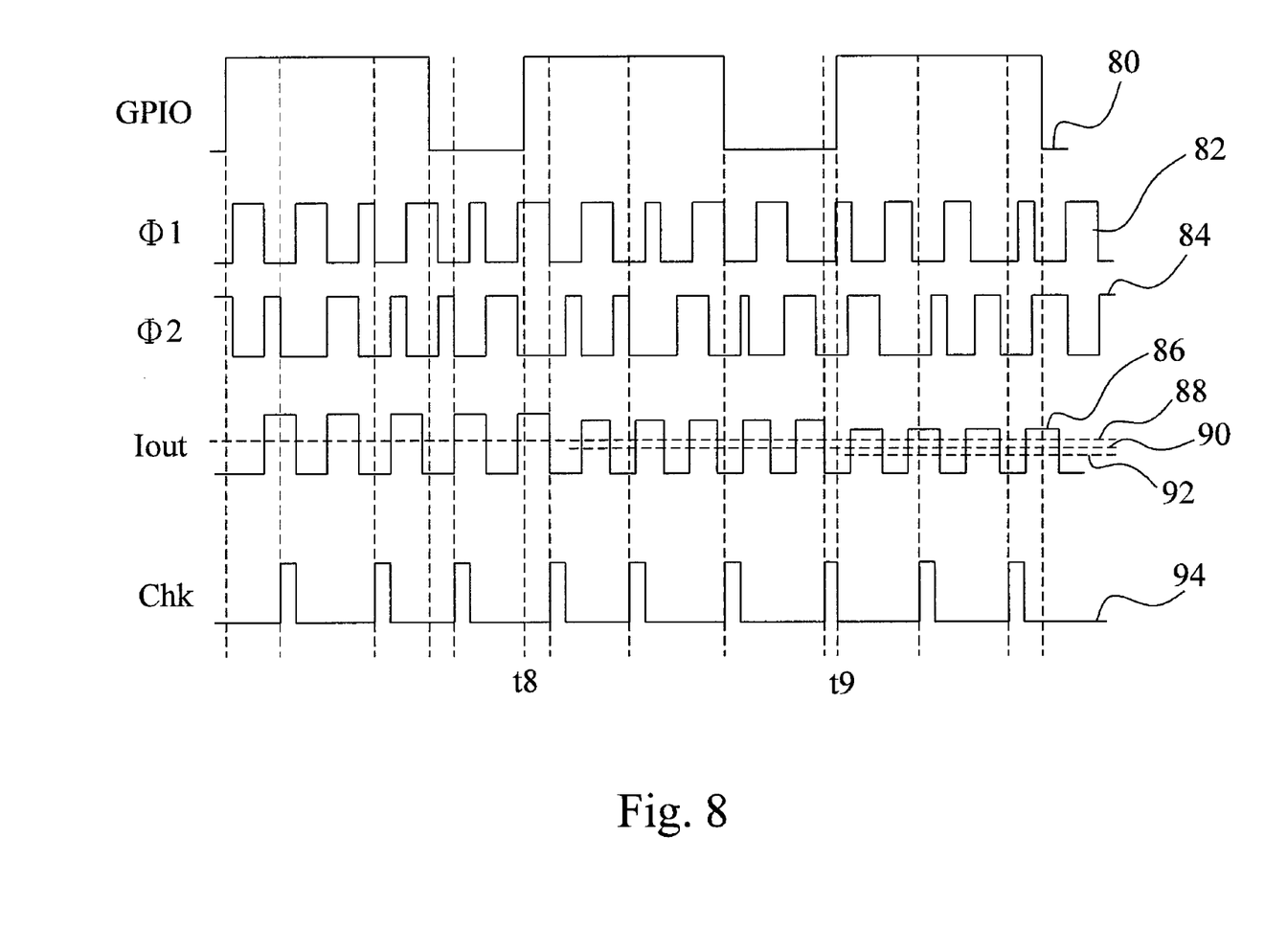
FIG. 8 is a waveform diagram of the circuit shown in FIG. 7.

FIG. 7 is a circuit diagram of a third embodiment for the LED driver IC 20 shown in FIG. 2, which is similar to that of FIG. 3 except that the chip enable/dimming control circuit 28 provides an adjust signal Sadj to adjust the current source 44. FIG. 8 is a waveform diagram of the circuit shown in FIG. 7, in which waveform 80 represents the dimming control signal GPIO, waveform 82 represents the switching signal Φ1, waveform 84 represents the switching signal Φ2, waveform 86 represents the drive current Iout, waveforms 88, 90 and 92 represent the average values Iout(AVG) of three states of drive currents Iout, respectively, and waveform 94 represents the check signal Chk. In FIGS. 7 and 8, the average value Iout(AVG) is adjusted by adjusting the source current I1. When the chip enable/dimming control circuit 28 receives the check signal Chk, it detects the voltage level of the dimming control signal GPIO from the capacitor pin CN, and each time it is detected that the dimming control signal GPIO transits from low to high, the chip enable/dimming control circuit 28 will adjust the magnitude of the source current I1 supplied by the current source 44. As shown by the equation Eq-2, adjusting the source current I1 will adjust the average value Iout (AVG) of the drive current Iout and so the luminance of the LED 22. Referring to the waveform 86 of the drive current Iout, at the beginning, the average value Iout(AVG) of the drive current Iout is as shown by the waveform 88; when the dimming control signal GPIO transits from low to high, as shown at time t8, the chip enable/dimming control circuit 28 decreases the source current I1, so the average value Iout (AVG) of the drive current Tout decreases as shown by the waveform 90; when the dimming control signal GPIO transit from low to high again, as shown at time t9, the chip enable/dimming control circuit 28 further decreases the source current I1, so the average value Iout(AVG) of the drive current Tout further decreases as shown by the waveform 92.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A low pin count LED driver IC, comprising:
   a voltage input pin receiving an input voltage;
   a first capacitor pin tied to a first terminal of a flying capacitor outside the low pin count LED driver IC;
   a common pin simultaneously serving as a second capacitor pin tied to a second terminal of the flying capacitor, and a voltage output pin connected to an LED and supplying an output voltage for driving the LED; and
   a switching circuit connected to the first capacitor pin and the common pin such that the switching circuit and the flying capacitor establish a charge pump to convert the input voltage into the output;
   wherein the second capacitor pin tied to the second terminal of the flying capacitor is not switched to a ground terminal.

2. The low pin count LED driver IC of claim 1, further comprising a current supply circuit connected to the switching circuit to provide a current for operation of the charge pump to thereby supply a drive current to the LED from the common pin.

3. The low pin count LED driver IC of claim 2, further comprising a control circuit connected to the first capacitor pin and the current supply circuit to detect a voltage level at the first capacitor pin to generate an enable signal for the current supply circuit, to adjust an average value of the drive current.

4. The low pin count LED driver IC of claim 3, wherein the control circuit makes the first capacitor pin floating according to a check signal, in order to detect the voltage level at the first capacitor pin.

5. The low pin count LED driver IC of claim 2, wherein the current supply circuit comprises:
   a current source operative to provide a source current;
   a first transistor having an input terminal connected to the voltage input pin, an output terminal connected to the current source, and a control terminal;
   a second transistor having an input terminal connected to the voltage input pin, an output terminal connected to the switching circuit, and a control terminal; and
   an operational amplifier having two input terminals connected to the output terminals of the first and second transistors, respectively, and an output terminal connected to the control terminals of the first and second transistors.

6. The low pin count LED driver IC of claim 5, further comprising a control circuit connected to the first capacitor pin and the current supply circuit to turn the operational amplifier on and off according to the voltage level at the first capacitor pin to adjust an average value of the drive current.

7. The low pin count LED driver IC of claim 6, wherein the control circuit makes the first capacitor pin floating according to the check signal, in order to detect the voltage level at the first capacitor pin.

8. The low pin count LED driver IC of claim 5, further comprising a control circuit connected to the first capacitor pin and the current supply circuit, operative to generate an adjust signal for the current source according to the voltage level of the first capacitor pin, to adjust the source current.

9. The low pin count LED driver IC of claim 8, wherein the control circuit makes the first capacitor pin floating according to the check signal, in order to detect the voltage level at the first capacitor pin.

* * * * *